United States Patent [19]
Raidel

[11] Patent Number: 4,541,653
[45] Date of Patent: Sep. 17, 1985

[54] AIR SPRING SUSPENSION WITH ANGULAR TORQUE BEAM, U-JOINT MOUNT THEREFOR, AND LATERAL GUIDES

[76] Inventor: John E. Raidel, Rte. 9, Box 400M, Springfield, Mo. 65804

[21] Appl. No.: 532,852

[22] Filed: Sep. 16, 1983

Related U.S. Application Data

[63] Continuation-in-part of Ser. No. 431,755, Sep. 30, 1982, Pat. No. 4,465,298, which is a continuation-in-part of Ser. No. 341,474, Jan. 21, 1982, abandoned.

[51] Int. Cl.⁴ .............................................. B60G 11/26
[52] U.S. Cl. .................................... 280/711; 280/702
[58] Field of Search .............. 280/711, 702, 705, 709, 280/712, 713, 704

[56] References Cited

U.S. PATENT DOCUMENTS

| | | | |
|---|---|---|---|
| 3,547,215 | 12/1970 | Bird | 180/71 |
| 3,801,086 | 4/1974 | Raidel | 267/67 |
| 4,114,923 | 9/1978 | Raidel | 280/711 |
| 4,132,432 | 1/1979 | Raidel | 280/711 |
| 4,132,433 | 1/1979 | Willetts | 280/712 |
| 4,181,323 | 1/1980 | Raidel | 280/711 |
| 4,293,145 | 10/1981 | Taylor | 280/711 |
| 4,309,045 | 1/1982 | Raidel | 280/711 |
| 4,397,478 | 8/1983 | Jensen et al. | 280/711 |
| 4,406,479 | 9/1983 | Chalmers | 280/678 |

*Primary Examiner*—Richard A. Bertsch
*Attorney, Agent, or Firm*—Rogers, Howell, Renner, Moore & Haferkamp

[57] ABSTRACT

A suspension system for a drive axle includes a torque beam fixedly secured to the axle, one or two air springs extending between the torque beam and the chassis, and a universal joint comprised of two transversely mounted rubber bushings mounting the forward end of the torque beam to the chassis. The torque beam may be overslung or underslung from the axle, and the universal joint mounted with its transverse bushing substantially on the same horizontal center line as the axle. The drive axle suspension may also have a beam guide mounted to the torque beam and extending upwardly adjacent the chassis frame, or a cross radius rod to limit lateral movement. Another embodiment of the suspension is for a steer axle which has a straight torque beam and either an outboard beam guide or an aft vertical rail guide to limit the lateral displacement of the suspension with respect to the chassis.

31 Claims, 37 Drawing Figures

AIR SPRING SUSPENSION WITH ANGULAR TORQUE BEAM, U-JOINT MOUNT THEREFOR, AND LATERAL GUIDES

BACKGROUND AND SUMMARY OF THE INVENTION

This application is a continuation-in-part of Ser. No. 06/431,755 filed Sept. 30, 1982, which issued on Aug. 14, 1984, as U.S. Pat. No. 4,465,298, which is a continuation-in-part of Ser. No. 341,474 filed Jan. 21, 1982, now abandoned.

Air suspensions for drive axles of truck type vehicles are very desirable as they provide increased comfort for the operator and, with proper stabilization of the axle, better control and safety. Applicant is the inventor of several prior air spring suspensions which can be used with drive axles including U.S. Pat. No. 4,114,923; U.S Pat. No. 4,132,432; and U.S. Pat. No. 4,181,323, the disclosures of which are incorporated herein by reference. All of these patents disclose air spring suspensions wherein a torque beam is rigidly mounted to an axle and an air spring suspends the torque beam from a chassis. Also, in each of these patents the movement of the torque beam is controlled through a parallelogram arrangement of torque rods which maintains the pitch of the axle to maintain the drive line in alignment as the axle oscillates with respect to the chassis. Also, several of these suspensions have a sway bar transversely mounted between the chassis and suspension to limit the lateral movement of the suspension as it oscillates. Of course, there are other features and advantages of each of these patented suspensions which will not be discussed as they are fully disclosed and claimed in their respective patents.

In the present invention, applicant has succeeded in developing a unique structure for controlling axle movement and stabilizing the suspension as the axle moves up and down in response to uneven road surfaces, or as one side of the truck goes over a curb, chuck hole, or other significant change in elevation with respect to the other side of the vehicle. In particular, applicant's new mounting structure for the torque beam and suspension will greatly minimize or eliminate the torsional forces in the beam which would otherwise be experienced as one side of the axle moves up or down with respect to the other. This is achieved by use of a pair of transversely mounted rubber bushings, one of the bushings being mounted coaxially to the torque beam and the other bushing being transversely mounted to the first bushing and pivotally mounted to a chassis member. Thus, twisting movement of the suspension in a lateral plane with respect to the chassis may be accommodated through pivotal movement of one bushing while pivotal movement of the rear of the suspension in a longitudinal plane may be accommodated by pivoting in the other bushing. Each suspension is free to move in this manner as one side of the axle moves up or down with respect to its other side. Furthermore, in the first two embodiments of the drive axle, one suspension is mounted to each axle at each side of the truck and they are rigidly connected with a torsion-roll bar extending therebetween. As a result, both suspensions want to move as a single assembly and the transversely mounted bushings permit such movement to a limited extent to prevent torsioning of either torque beam. In a variation of these embodiments, a beam guide comprising a bracket extending upwardly from the torque beam and a wear pad mounted to the chassis frame limits the lateral displacement of the suspension and axle with respect to the chasis. In the steer axle embodiment, a pair of roller type beam guides extend downwardly from each side of the chassis and ride against a flattened surface on the outside of each torque beam to prevent lateral displacement of the chassis with respect to the suspension, and thereby perform the same function as a sway bar. In a variation of this embodiment, an aft beam member with a self-lubricating fiber sleeve extends between a pair of spaced vertical rail guides to limit lateral chassis displacement. A beam guide is particularly advantageous in a steer axle suspension as the steering components take up much of the available space for a sway bar, and it is easier to install and maintain.

The first two embodiments of the drive axle suspensions generally include an angular torque beam which extends rearwardly along the top of the axle, downwardly, and then rearwardly to provide a platform for mounting of the air spring. The air spring is mounted at the rear of the angular torque beam and extends between it and the chassis. The axle is clamped to a medial portion of the angular torque beam with a standard axle bracket and U-bolt assembly. The forward end of the torque beam has a first rubber bushing which is coaxially mounted to the torque beam. A second transversely oriented rubber bushing is pivotally connected to the first bushing and, depending upon the embodiment, is either over or under the first bushing. The second bushing is then pivotally mounted to a chassis member. A cross radius rod is pivotally connected to and extends between the center of the axle and a chassis member to further stabilize the axle and limit its lateral movement. Alternately, a beam guide including a bracket mounted to the torque beam, sliding against a wear pad mounted to the chassis limits lateral axle displacement. A torsion roll-bar is mounted at the rear of the angular torque beam and extends from one side of the vehicle to the other to connect suspensions on opposite sides thereof. One or more shock absorbers extend between the angular torque beam and the chassis, as is known in the art. In a third embodiment, a straight torque beam is clamped to the axle, and a pair of air springs suspend the beam and axle from the chassis, one on either side of the axle. The U-joint assembly comprising the transversely oriented bushings mount the fore end of the torque beam to a chassis member as in the other embodiments.

The steer axle suspension embodiment includes a generally straight torque beam extending longitudinally beneath the chassis member and bolted to the top of the steer axle. An air spring plaform is provided in the rearward half of the torque beam immediately above the axle with an air spring extending between the platform and chassis. An overload bumper is mounted adjacent to and rearwardly of the air spring, and a downwardly extending tail piece on the torque beam provides a mounting position for a shock absorber. A roller guide is mounted to the chassis and extends downwardly at a point just forward of the spring and outboard of the torque beam. An upstanding bracket member is welded to the top of the torque beam and, along with the side of the torque beam forms a generally flattened surface against which the roller may roll as the suspension oscillates. Of course, as a suspension is mounted to each side of the vehicle, each suspension being rigidly bolted to the axle, the roller guides "capture" the suspension-axle assembly between them to restrict the lateral movement thereof much as a sway bar. The forward end of the torque beam is secured to the chassis with a univeral joint combination as in applicant's drive axle suspensions. In an alternate embodiment, the beam guide comprises a rod-like member extending rearwardly from the rear of the torque beam and between two spaced apart vertically extending brackets secured to the chassis. A self-lubricating fiber sleeve surrounds the rod which facilitates the unrestricted movement thereof between the close fitting vertical brackets. Lateral movement of the suspension is resisted by the bracket's contact with the rod.

In still another embodiment, a generally straight torque beam is underslung at its mid-point from the axle, with an air spring extending between the rear of the torque beam and the chassis and a universal joint as described above mounting the forward end of the torque beam from a hanger assembly. The universal joint has a first bushing mounted in line with the torque beam, and a second bushing mounted transverse to the first bushing and above it to a hanger assembly so that its centerline is substantially at the same center line as the axle. Orienting the U-joint with the transverse bushing at the same centerline as the axle ensures that the axle moves virtually vertically as it deflects with respect to the chassis during vehicle operation. Also included in the U-joint is an elastomeric bushing which has separate elastomeric members which can be slipped into place during assembly, and a center bolt tightened against compression plates to squeeze the elastomeric members into contact with the surrounding sleeve for operation.

In a variation, the torque beam may be formed in two members with a pair of spaced elastomeric bushings joining them to allow for limited movement between them to accommodate torsional forces in the beam. The inventor herein is also the inventor of U.S. Pat. No. 3,801,086 which discloses a suspension having a pair of spaced elastomeric bushings such as that disclosed herein. In the present invention, as in the patented suspension, one of the beam members is fixed to the axle and also mounts the air spring. In the present invention, however, the other member extends between the U-joint mount and the spaced bushing mounted near the axle to act like a torque rod, but also permit a greater degree of controlled articulation than was available in the previous design.

In a second variation, the forward hanger bracket may be offset outboard, and a bolster rail may extend between these offset brackets on opposite sides of the vehicle to strengthen them. This arrangement provides additional space for the mounting of other suspension components, such as a leaf spring or the like.

In yet another embodiment, the generally straight torque beam is overslung from the axle, with the air spring extending from between the rear of the torque beam and the chassis and a universal joint mounting the forward end of the beam from a hanger assembly, except that the bushings are reversed. In the overslung embodiment, the U-joint has a first bushing mounted in line with the torque beam and a second bushing mounted transversely and below it to a hanger assembly so that its centerline is substantially at the same centerline as the axle.

In a variation of this overslung embodiment, as in the underslung embodiment, the torque beam may be formed in two members with a pair of spaced elastomeric bushings joining them to allow for limited oscillation to accommodate torsional forces in the beam.

Applicant's suspensions are shown and described more completely in the following drawings and description of the preferred embodiments.

DETAILED DESCRIPTION OF THE PREFERRED EMBODIMENT

Figure 1:
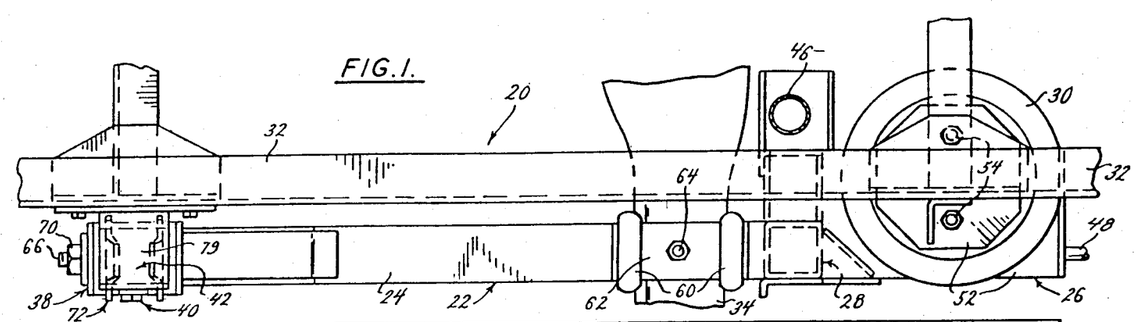
FIG. 1 is a top view of the first embodiment of applicant's drive axle suspension.
Figure 2:
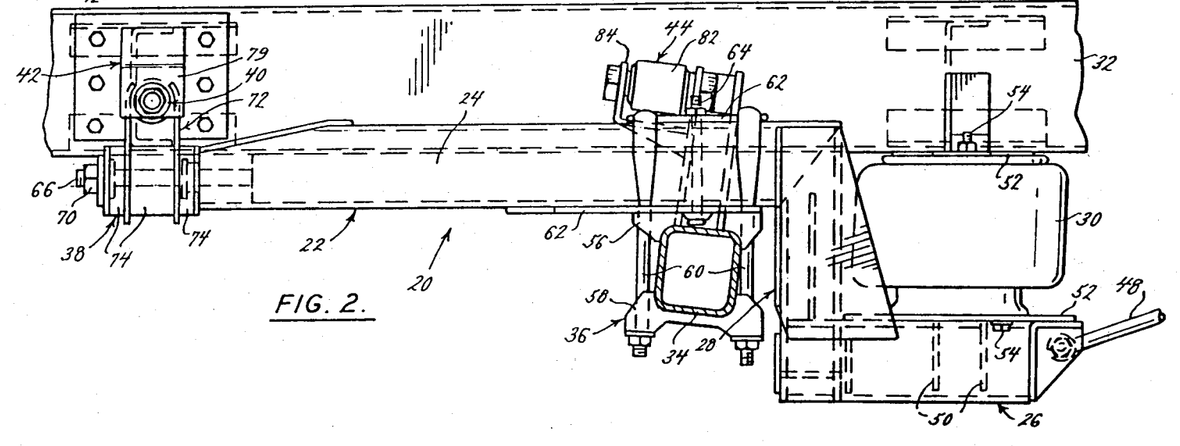
FIG. 2 is a side view of the first embodiment.
Figure 3:
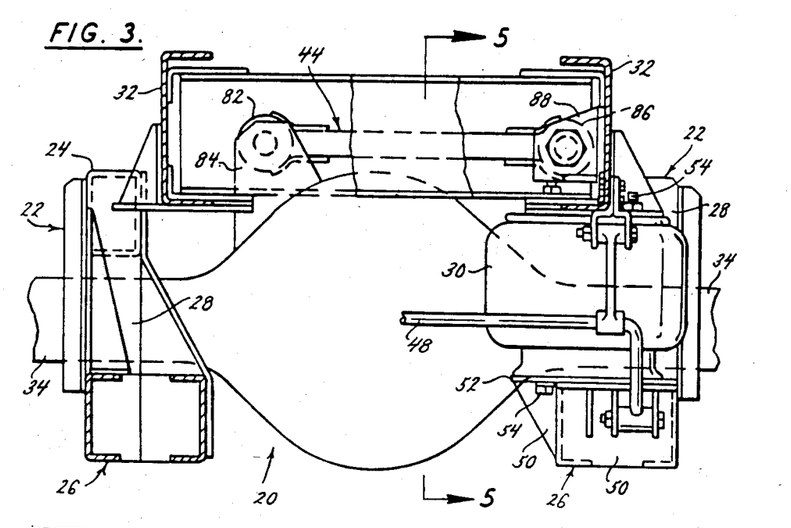
FIG. 3 is a rear view of the first embodiment showing the cross radius rod.
Figure 4:
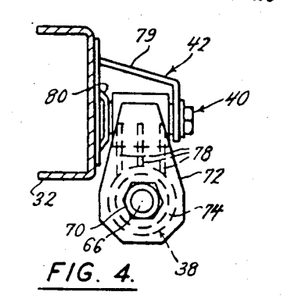
FIG. 4 is a front view of the first embodiment showing the second bushing mounted transversely above the first bushing.
Figure 5:
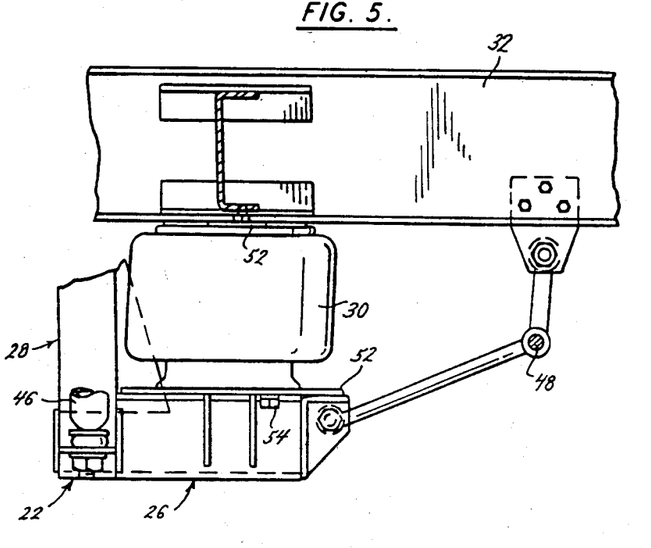
FIG. 5 is a partial side view taken along the plane of line 5—5 in FIG. 3 detailing the torsion roll bar.

Applicant's first embodiment 20 of the drive axle suspension is shown in FIGS. 1 through 5 and, with particular reference to FIGS. 1 and 2, generally includes an angular torque beam 22 having a first horizontal member 24, a second horizontal member 26, and a generally vertical member 28 extending therebetween. An air spring 30 is bolted to and extends between the second horizontal member 26 and the chassis 32. The axle 34 is fixedly secured to the first horizontal member 24 by an axle seat assembly 36. The forward end of torque beam 22 is pivotally mounted to a first rubber bushing 38 which is coaxially aligned therewith. A second, transversely mounted, rubber bushing 40 is pivotally mounted to the first rubber bushing 38 and above same. This is best shown in FIG. 4. The second rubber bushing 40 is itself pivotally mounted to a bracket assembly 42 secured to the chassis 32. As shown in FIG. 3, a cross radius rod 44 is pivotally connected to and extends between the axle 34 and chassis 32. A shock absorber 46 is shown figuratively in FIG. 1, and may be conveniently mounted at any point along the chassis 32 and extend to the torque beam 22. A torsion roll-bar 48, as is best shown in FIGS. 3 and 5, extends between the chassis 32 and suspensions 20 mounted on opposite sides of the vehicle. Having generally described the major components of the drive axle suspensions, applicant will now proceed with a more detailed description thereof.

The torque beam 22 is generally a hollow rectangular beam having varying dimensions in its various members. Accordingly, strengthening webs 50 are mounted at various points along the torque beam 22 to further rigidize and brace it. Spring support plates 52 and bolts 54 are used to secure air spring 30 to both the chassis 32 and second horizontal member 26, as is known in the art. The axle bracket assembly 36 includes an upper axle bracket 56, a lower axle bracket 58, a pair of U-bolts 60, and upper and lower strengthening brackets 62 held in place by nut and bolt assembly 64. The forward end of applicant's torque beam 22 is formed into a threaded mounting stud 66 which extends through first rubber bushing 38 and is secured thereto with nut 70. A swivel bracket 72 is mounted to first rubber bushing 38 and aligned with spacers 74 thereon. Swivel bracket 72 surrounds the second rubber bushing 40 and has strengthening webs 78. Bracket assembly 42 mounts second bushing 40 with an eccentric bolt assembly to chassis 32 and is comprised of an outer hanger bracket 79 and an inner hanger bracket 80, both of which are secured by welding or the like to the chassis 32, as best shown in FIG. 4. Cross radius rod 44 is best shown in FIG. 3 and has a pivotal connection 82 securing it to an axle mounting bracket 84 at one end; with a second pivotal connection 86 securing it to a chassis mounting bracket 88 at its other end.

Figure 6:
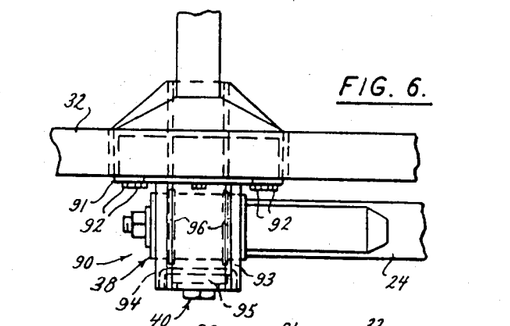
FIG. 6 is a top view of the forward end of applicant's second embodiment.
Figure 7:
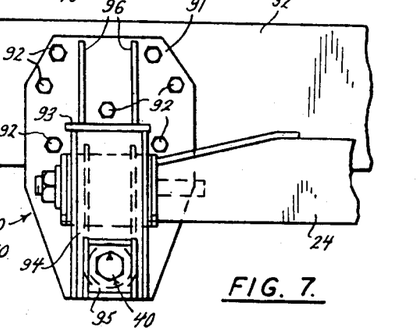
FIG. 7 is a side view of the forward end of the torque beam showing the second bushing mounted beneath the first bushing in the second embodiment.
Figure 8:
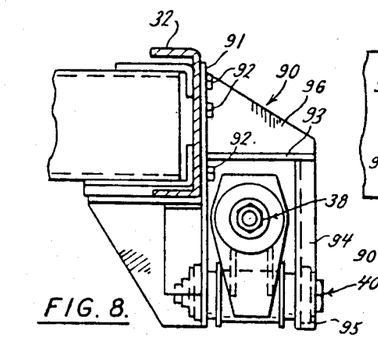
FIG. 8 is a front view of the second embodiment of applicant's drive axle suspension showing in greater detail the hanger assembly and mounting of the second bushing below the first.

Applicant's second embodiment of the drive axle suspension is depicted in FIGS. 6 through 8 and is very similar to the embodiment shown in FIGS. 1 through 5 except that a different hanger assembly 90 is utilized which permits mounting of the second bushing assembly 40 below the first bushing assembly 38. This is best seen by comparing FIG. 8 (second embodiment) with FIG. 4 (first embodiment). Hanger assembly 90 has a back plate 91 which is secured by bolts 92 to chassis member 32, a horizontal bracket 93 extending outwardly from back plate 91, and a side plate 94 which depends downwardly therefrom. An adjustable mounting plate 95 mounts one end of second bushing 40 to side plate 94 and the other end thereof mounts to back plate 91. Gussets 96 extend between these various brackets to strengthen same. A swivel bracket 72 pivotally connects first bushing 38 to second bushing 40 with an eccentric bolt assembly, as in the first embodiment 20.

Figures 9, 10:
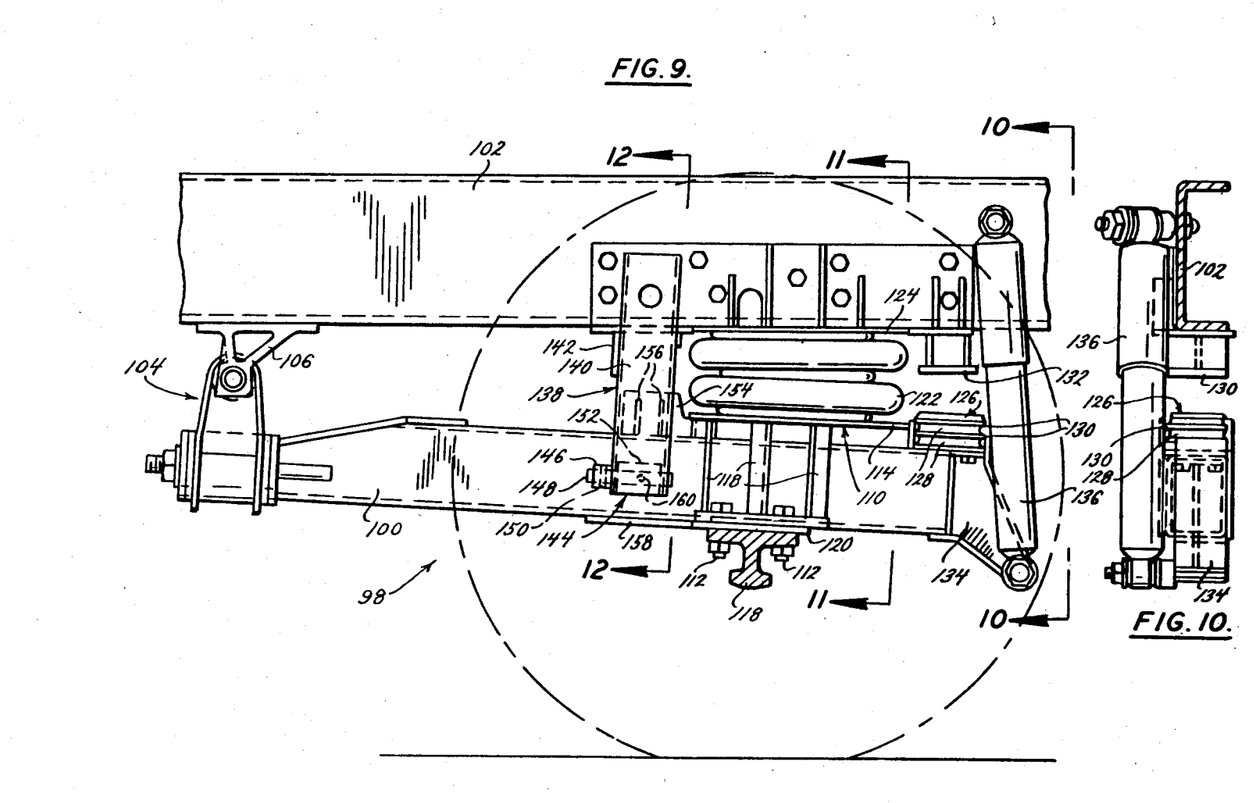
FIG. 9 is a side elevational view of applicant's steer axle suspension.
FIG. 10 is a rear view of the steer axle suspension taken along the plane of line 10—10 in FIG. 9.
Figure 11:
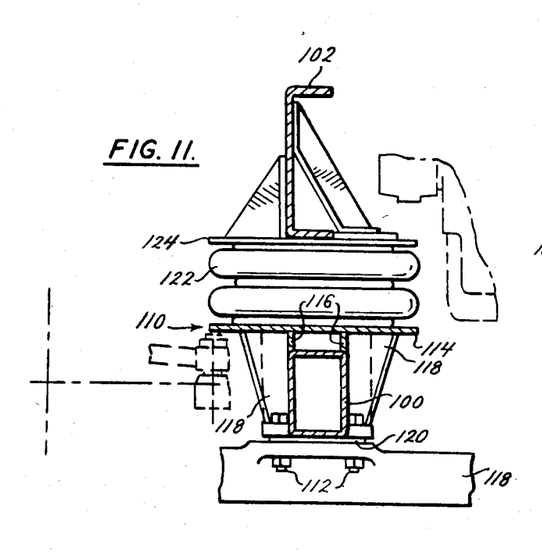
FIG. 11 is a cross-sectional view taken along the plane of line 11—11 in FIG. 9 and detailing the air spring platform.

Applicant's steer axle embodiment 98 is shown in FIGS. 9-13 and, with reference to FIG. 9, includes a generally straight torque beam 100 having a substantially rectangular cross section with its forward end mounted to the chassis 102 by a universal joint 104 which is substantially similar to the transversely mounted rubber bushings 38, 40 shown in FIG. 2. A slightly different bushing bracket 106 mounts the upper bushing of universal joint 104 to chassis 102. However, there is no change in function. The steer axle 118 is bolted to the air spring platform 110 by a plurality of bolt assemblies 112. As best shown in FIG. 11, the air spring platform 110 includes an upper mounting plate 114 supported by two bracket members 116 welded to the top of the torque beam 100 and a plurality of cross webs 118 extending between the upper mounting plate 114 and a lower axle plate 120. An air spring 122 is mounted and extends between the upper mounting plate 114 and a top plate 124, top plate 124 being welded to chassis 22. An overload bumper 126 is mounted rearwardly of the air spring platform 110 and is comprised of a sandwich spring having elastomeric pads 128 between steel plates 130. A matching upper bumper 132 is welded to the chassis 22 and extends downwardly therefrom to contact overload bumper 126 upon excessive loading or compression of air spring 122. A tail piece 134 angles downwardly from the rear of torque beam 100 and provides a convenient mounting position for shock absorber 136.

Figure 12:
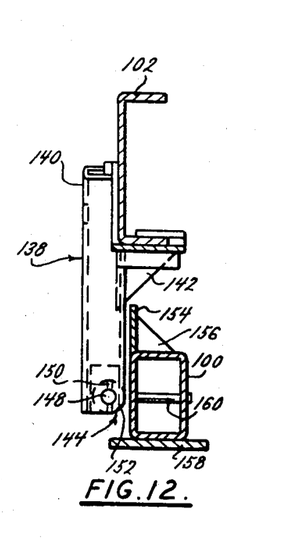
FIG. 12 is an oblique cross-sectional view taken along the plane of line 12—12 in FIG. 9 and detailing the roller guide.
Figure 13:
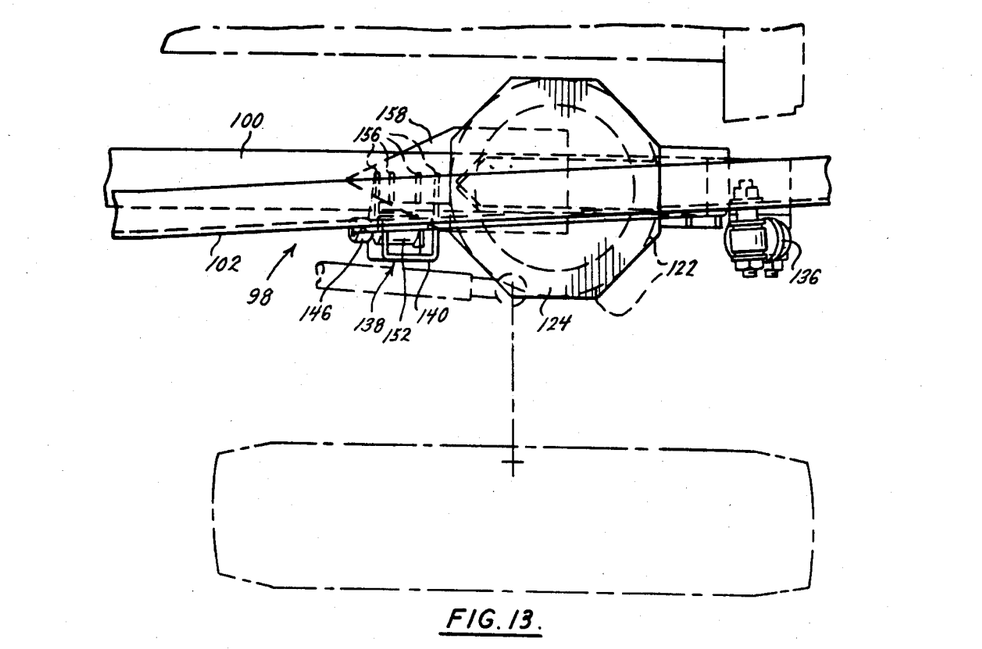
FIG. 13 is a top view of applicant's steer axle suspension.

As best shown in FIGS. 9 and 12, a roller guide 138 is mounted forwardly of air spring 122 and outboard of torque beam 100 and generally includes an elongated bracket member 140 welded to and extending downwardly from the chassis 102, with several strengthening webs 142 welded therebetween. Elongated bracket member 140 is generally U-shaped in cross section such that a roller assembly 144 may be mounted near the lower end thereof. Roller assembly 144 includes a boss 146 welded to the forward side of bracket member 140, with an axle pin 148 extending through boss 146 and bracket member 140 and pinned in place by linch pin 150. A roller 152 is rotatably mounted to axle pin 148 and between the ears of U-shaped elongated bracket member 140.

As best shown in FIG. 12, the roller 152 very nearly rests on the side of torque beam 100, with an upstanding bracket 154 welded to the top of torque beam 100 with strengthening webs 156 extending therebetween. A splash plate 158 is welded to the bottom of torque beam 100 and a brace 160 extends through the interior of torque beam 100 directly opposite roller assembly 144 to prevent deformation of the torque beam 100 as the suspension 98 oscillates.

Figure 14:
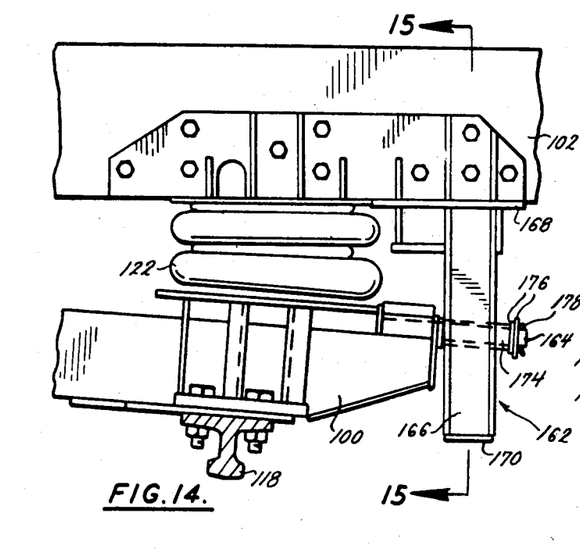
FIG. 14 is a partial side view of the steer axle suspension showing the alternate beam guide.
Figure 15:
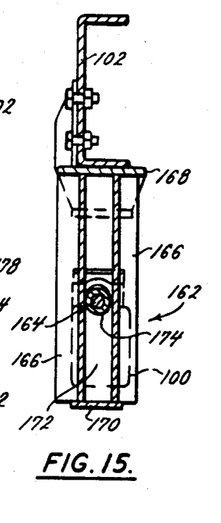
FIG. 15 is a cross-sectional view taken along the plane of line 15—15 in FIG. 14 which further details the alternate beam guide.

As an alternative to the roller guide 138 depicted in FIG. 9 with a steer axle suspension, an alternate beam guide 162 may be provided at the rear of torque beam 100 as shown in FIGS. 14 and 15. As shown therein, a rod-like beam extension 164 extends rearwardly from torque beam 100 between a pair of spaced vertical bracket members 166 which are welded to a top plate 168 which is in turn welded to chassis frame 102. A bottom plate 170 encloses the space 172 defined between bracket members 166 and within which rod 164 travels as torque beam 100 and axle 118 oscillate with respect to the chassis 102 during vehicle operation. A self lubricating fiber sleeve 174 slides over rod 164 and is held in place with washers 176 and cotter key 178. Thus, lateral displacement of torque beam 100 and axle 118 is restricted through contact between fiber sleeve 174 and surrounding rod 164 and bracket members 166.

Figure 16:
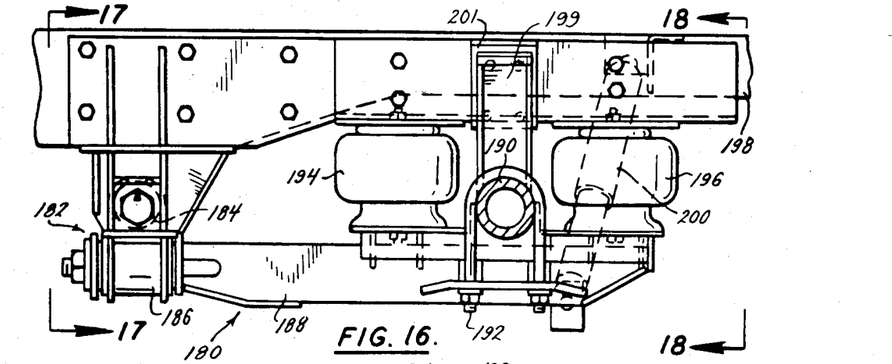
FIG. 16 is a side view of the third embodiment of the drive axle suspension having two air springs.
Figures 17, 18:
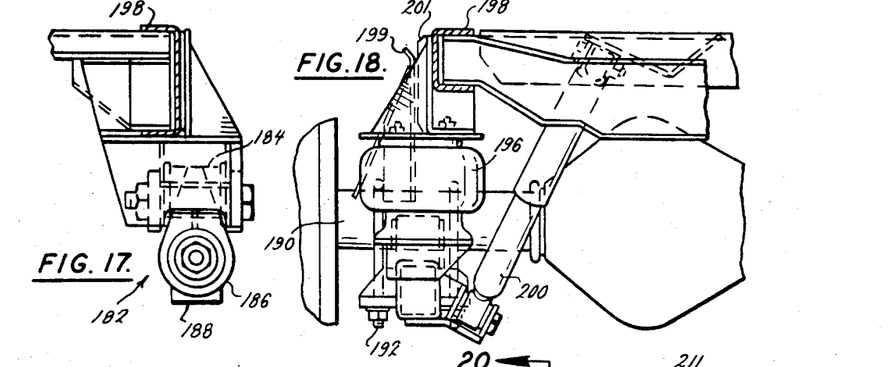
FIG. 17 is a front view of the suspension of FIG. 16, taken along the plane of line 17—17 in FIG. 16.
FIG. 18 is a rear view of the suspension of FIG. 16, taken along the plane of line 18—18 in FIG. 16.

A third embodiment 180 of a drive axle suspension is shown in FIGS. 16, 17 and 18 which incorporates many of the same components of other embodiments disclosed herein. For example, a U-joint assembly 182 comprised of an upper rubber bushing assembly 184 and a transversely mounted lower rubber assembly 186 mount the fore end of a straight torque beam 188. Torque beam 188 is bolted to axle 190 buy U-bolt assembly 192 with a fore air spring 194 and aft air spring 196 suspending torque beam 188 and axle 190 from chassis 198. An alternative design beam guide 199 mounts atop axle 190 with a wear pad 201 bolted to frame 198 to stabilize suspension 180 as it oscillates with respect to frame 198. This design is described and shown more completely in the suspension shown in FIGS. 19A, and B, and FIG. 20. One or more shock absorbers 200 are mounted to torque beam 188 and chassis member 198, as is known in the art. Thus, a dual air spring suspension is provided which utilizes the U-joint mounting of the fore end of its torque beam to permit limited flexing in both the longitudinal and lateral planes during vehicle operation.

Figure 19A:
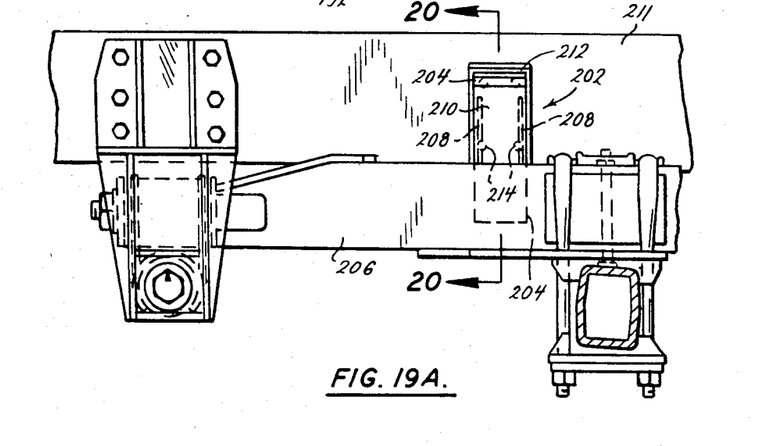
FIGS. 19A and 19B are side views of the drive axle suspension with angular torque beam with beam guide.
Figure 19B:
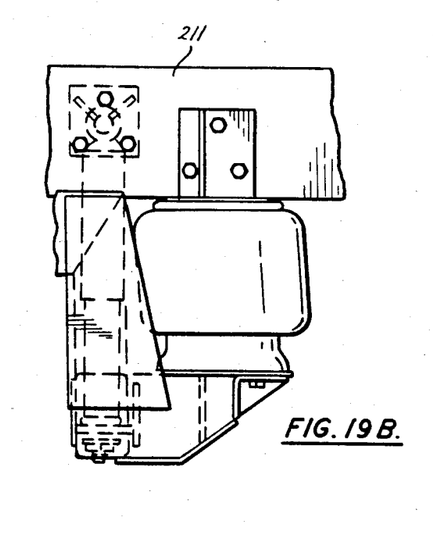
Figure 20:
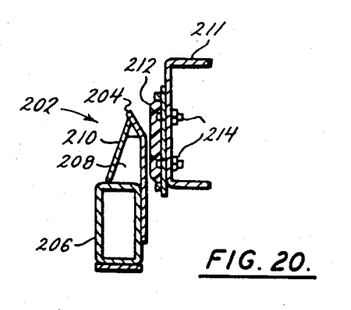
FIG. 20 is a cross-sectional view of the beam guide of FIGS. 19A-B taken along the plane of line 20—20 in FIG. 19.

Still another alternative to the beam guides previously disclosed in this application is the beam guide 202 shown in FIGS. 19A, 19B and 20 as used with a drive axle suspension similar to that shown in FIGS. 1-5. Beam guide assembly 202 includes an angular bracket member 204 welded to the inside of torque beam 206 with a pair of bracket struts 208 and a back plate 210 supporting same. The upper portion of bracket 204 is bent away from frame member 210 to prevent the beam guide 202 from catching underneath the frame member 211 during operation. A wear pad 212 is bolted to frame member 211 with bolts 214 and provides a surface against which the face of bracket member 204 may slide. Wear pad 212 may be a self lubricating fiber pad or some other similar type of material which facilitates the ready sliding of the beam guide 202 during vehicle operation.

Figures 21, 22, 23, 24, 25:
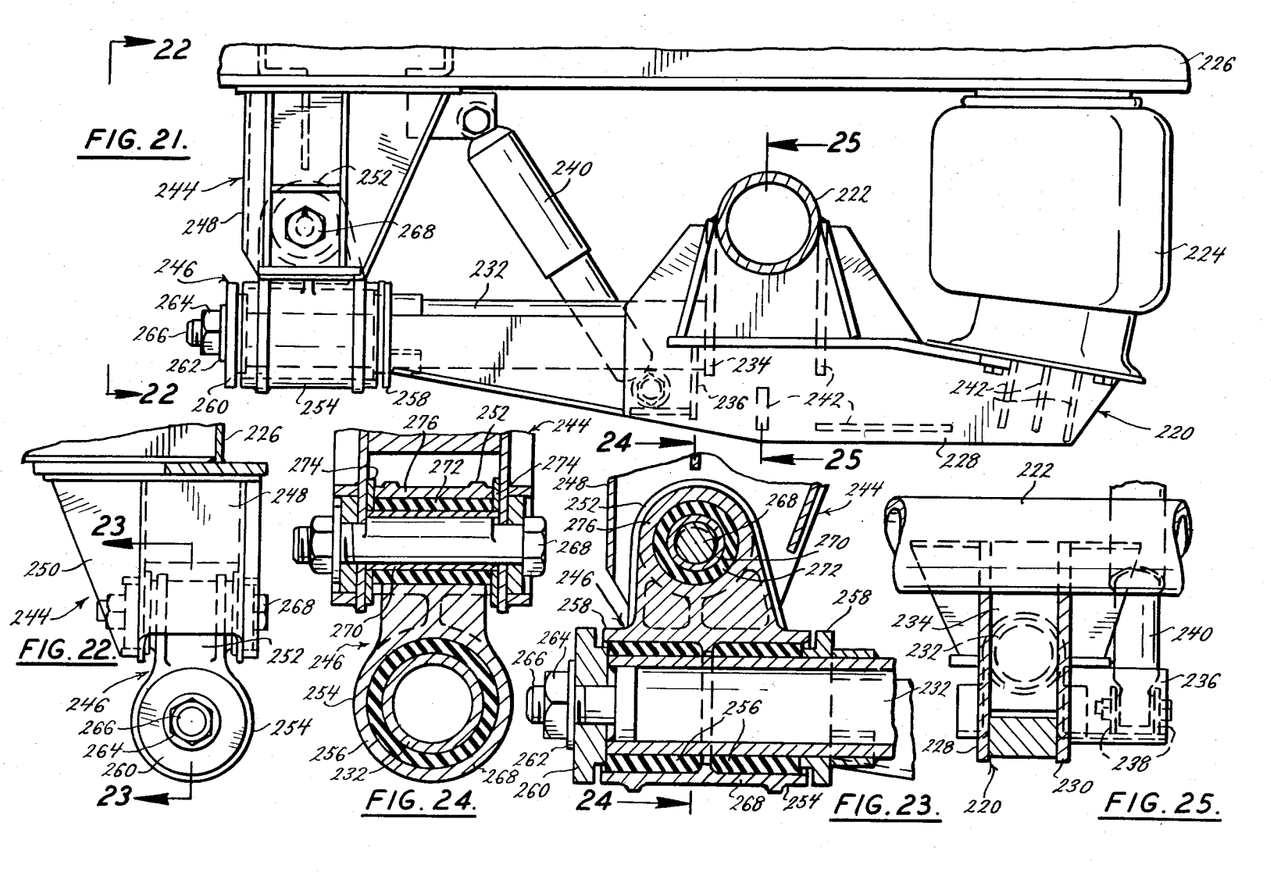
FIG. 21 is a side view of the underslung suspension having a substantially straight torque beam with universal joint mount.
FIG. 22 is a front view of the suspension of FIG. 21 taken along plane of line 22—22 in FIG. 21.
FIG. 23 is a cross-sectional view of the universal joint taken along the plane of line 23—23 in FIG. 22.
FIG. 24 is a cross-sectional view of the universal joint taken along the plane of line 24—24 in FIG. 23.
FIG. 25 is a cross-sectional view of the axle and torque beam taken along the plane of line 25—25 in FIG. 21.

Another embodiment of a suspension utilizing a universal joint mount is shown in FIGS. 21 to 25 and includes a one piece torque beam 220 welded to axle 222, with an airspring 224 mounted between the rear of torque beam 220 and the chassis member 226. As shown in FIG. 25, torque beam 220 includes a pair of spaced bracket members 228, 230 which extend rearwardly, and a generally cylindrical torque rod 232 which extends forwardly from cross plate 234.

An L-shaped side bracket 236 is welded to bracket member 230 and has mounting tabs 238 for the mounting of one end of shock absorber 240. As shown in FIG. 21, several cross bracket members 242 extend between spaced bracket members 228, 230 to strengthen torque beam 220.

A front hanger assembly 244 provides the mounting point for U-joint 246 which pivotally mounts the forward end of cylindrical torque rod 232. As shown in greater detail in FIG. 22, front hanger assembly 244 is comprised of a generally U-shaped bracket member 248 with strengthening web 250 stabilizing it with respect to chassis 226. U-joint 246 includes an upper bushing member 252 and a lower bushing member 254 transversely mounted thereto, lower bushing member 254 being mounted in line with cylindrical torque rod 232, and upper bushing member 252 having its center axis substantially on the same horizontal centerline as axle 222.

U-joint 246 is shown in cross-sectional detail in FIGS. 23 and 24. As shown in FIG. 23, lower bushing member 254 includes a pair of elastomeric members 256 which surround cylindrical torque rod 232, an inside compression plate 258, an outside compression plate 260, washer 262 and threaded nut 264 which fastens to a threaded stud 266 at the end of cylindrical torque rod 232. Thus, as nut 264 is tightened on stud 266, compression plates 258, 260 compress elastomeric members 256 therebetween until they fill the cylindrical cavity within outer cylinder 268.

As shown in FIG. 24, upper bushing member 252 includes a center bolt and nut 268 surrounded by a cylindrical sleeve 270. An elastomeric member 272 surrounds the sleeve and is compressed between spacer washers 274, and the outer cylinder member 276. Bolt and nut assembly 268 may be an eccentric bolt to aid in axle alignment.

Figures 26, 27, 28:
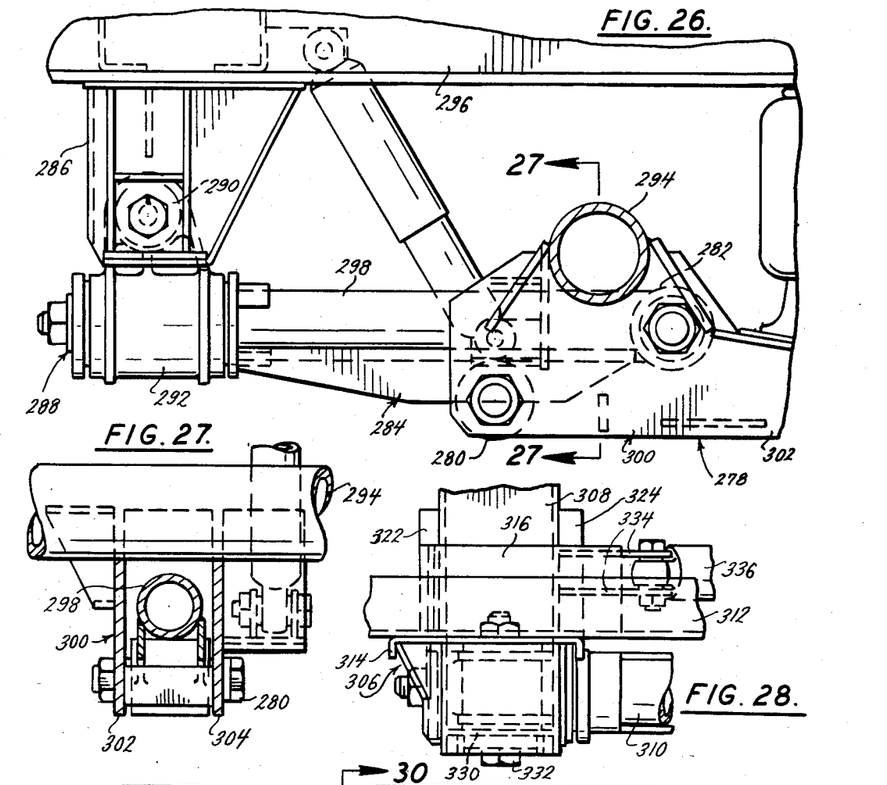
FIG. 26 is a partial side view of the underslung suspension having a two piece torque beam with spaced elastomeric bushings and U-joint mount.
FIG. 27 is a cross-sectional view of the axle and torque beam taken along the plane of line 27—27 in FIG. 26.
FIG. 28 is a top view of an offset front hanger and bolster beam variation of the suspension of FIG. 26.

As shown in FIGS. 26 and 27, the underslung suspension of the present invention may also be comprised of a two piece torque beam 278 with a pair of spaced elastomeric bushings 280, 282 similar to the suspension of FIGS. 21 to 25. The forward torque beam member 284 is similarly supported from hanger assembly 286 by U-joint 288, U-joint 288 having an upper bushing member 290, and a lower bushing member 292. Upper bushing member 290 is mounted so that its axis is substantially along the same horizontal centerline as axle 294 to provide for substantially vertical articulation as the wheel and axle 294 move with respect to the chassis 296 in response to the vehicle moving over rough or uneven surfaces. The lower bushing assembly 292 is coaxially mounted to the generally cylindrical torque rod 298 which forms part of the forward torque beam member 284. The rear torque beam member 300 is welded to axle 294 and includes a pair of spaced parallel bracket members 302, 304 between which extend elastomeric bushings 280, 282 to join fore torque beam member 284 to aft torque beam member 300, as best shown in FIG. 27.

In the embodiment of FIGS. 26 and 27, the spaced elastomeric bushings 280, 282 permit limited oscillation of the torque beam members 284, 300 as one side of axle 294 deflects with respect to chassis 296. The inventor herein is also the inventor or similar suspensions having two torque beam members joined by spaced elastomeric bushings, including U.S. Pat. No. 4,309,045 issued Jan. 5, 1982 and U.S. Pat. No. 3,801,086 issued Apr. 2, 1974. However, in each of these prior patents the forward end of the torque beam was secured with a simple bushing to the hanger assembly. With the U-joint 288, additional controlled movement of the axle 294 with respect to the chassis 296 is permitted, thereby increasing the stability of the vehicle while allowing for greater articulation of the axle.

Figures 29, 30:
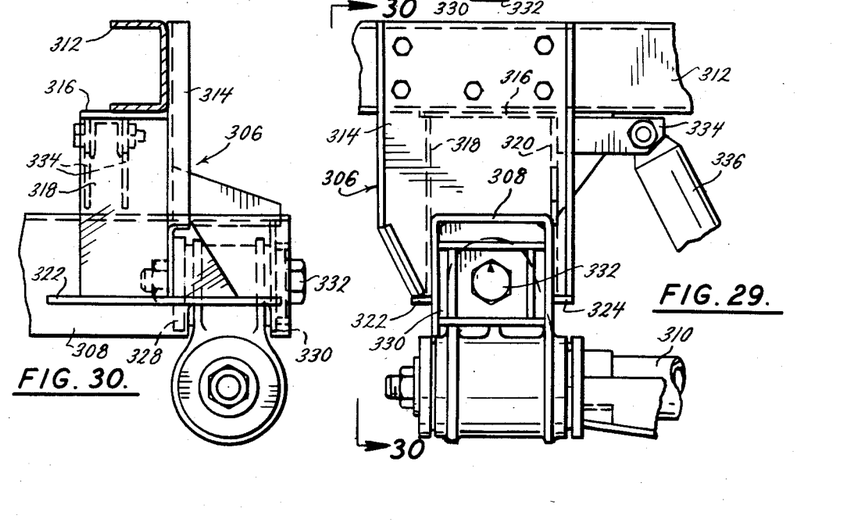
FIG. 29 is a side view of the offset hanger and bolster beam variation.
FIG. 30 is a front view of the offset hanger and bolster beam variation taken along the plane of line 30—30 in FIG. 29.

In a variation of the suspension shown in FIGS. 26 and 27, FIGS. 28 to 30 disclose an offset front hanger 306 and bolster beam 308 to mount and stabilize the forward end of torque beam 310. This arrangement provides additional offset space for existing suspensions on the vehicle, such a leaf spring suspension, and also permits outboard mounting of the torque beam 310 beyond the vertical line of chassis member 312. As best shown in FIG. 30, offset hanger assembly 306 includes an outside hanger plate 314 which mounts to the face of chassis member 312 and extends downwardly therefrom. An upper mounting plate 316, and two downwardly depending bracket members 318, 320 are welded between upper bracket member 316 and outside hanger plate 314. A pair of bottom brackets 322, 324 are welded between side brackets 318, 320 and bolster beam 308. A pair of mounting brackets 328, 330 provide the mounting points for upper bushing assembly 332. A pair of shock brackets 334 welded to side bracket 320 and upper mounting plate 316 provide a mounting point for the upper end of shock 336. Bolster beam 308 extends from one side of the vehicle to the other to connect and strengthen the offset hanger assemblies 306.

Figures 31, 32:
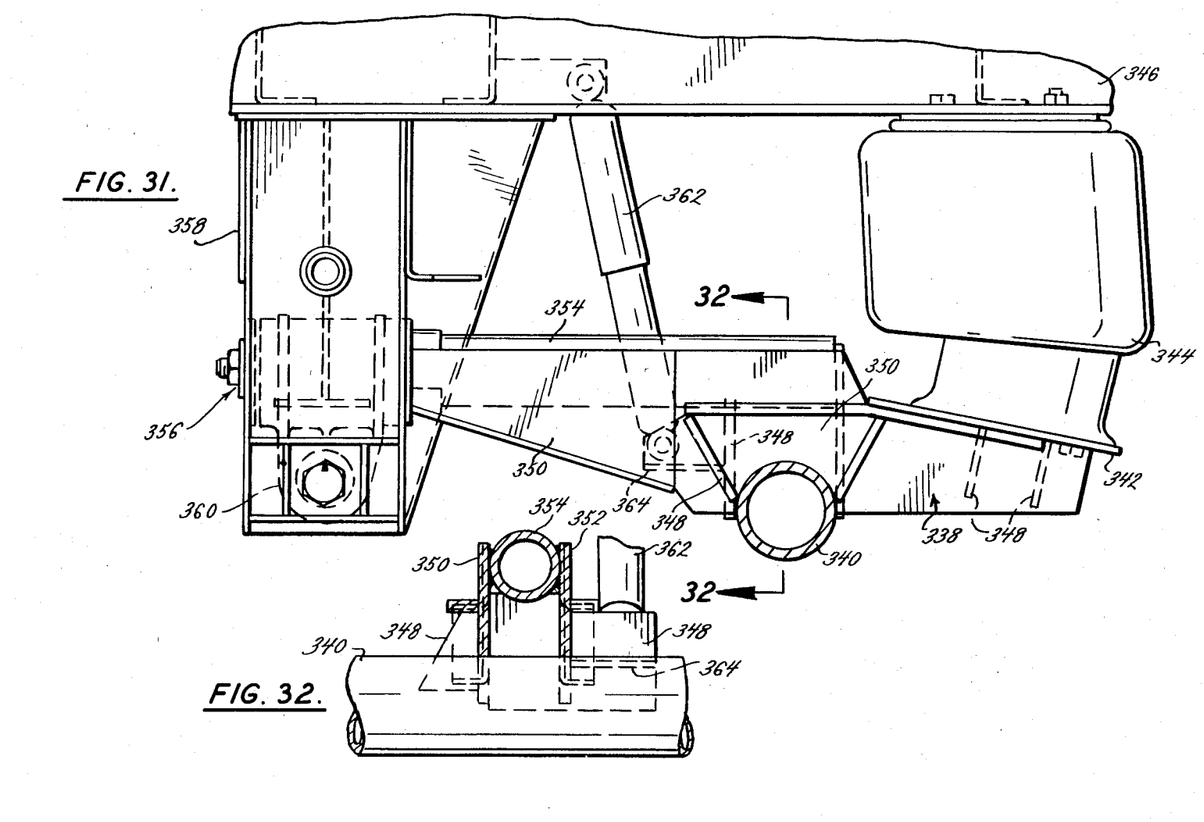
FIG. 31 is a side view of a suspension having a generally straight torque beam mounted in overslung manner to the axle with a universal joint mount.
FIG. 32 is a cross-sectional view of the axle and torque beam taken along the plane of line 32—32 in FIG. 31.

The suspension of FIGS. 31 and 32 is similar to that shown in FIGS. 21 to 25 except that the torque beam 338 is overslung mounted to axle 340, and the U-joint is reverse mounted to maintain the desired geometry of mounting the transverse bushing thereof along substantially the same horizontal centerline as the axle. The one piece torque beam 338 has a rear spring platform 342 to mount an airspring 344 between it and chassis member 346.

Gusset plates 348 extend between the bracket members 350, 352 forming the rear of torque beam 338. As shown in FIG. 32, the generally cylindrical torque rod 354 forming the forward position of torque beam 338 is welded between bracket members 350, 352 and extends from above axle 340 forwardly to U-joint 356, U-joint 356 being supported by front hanger assembly 358. As with the other embodiments of this invention, the bushing 360 which mounts U-joint 356 to front hanger assembly 358 is generally along the same horizontal line as the centerline of axle 340. A shock 362 extends from front hanger assembly 358 to a bracket 364 mounted to torque beam 338.

Figures 33, 34, 35, 36:
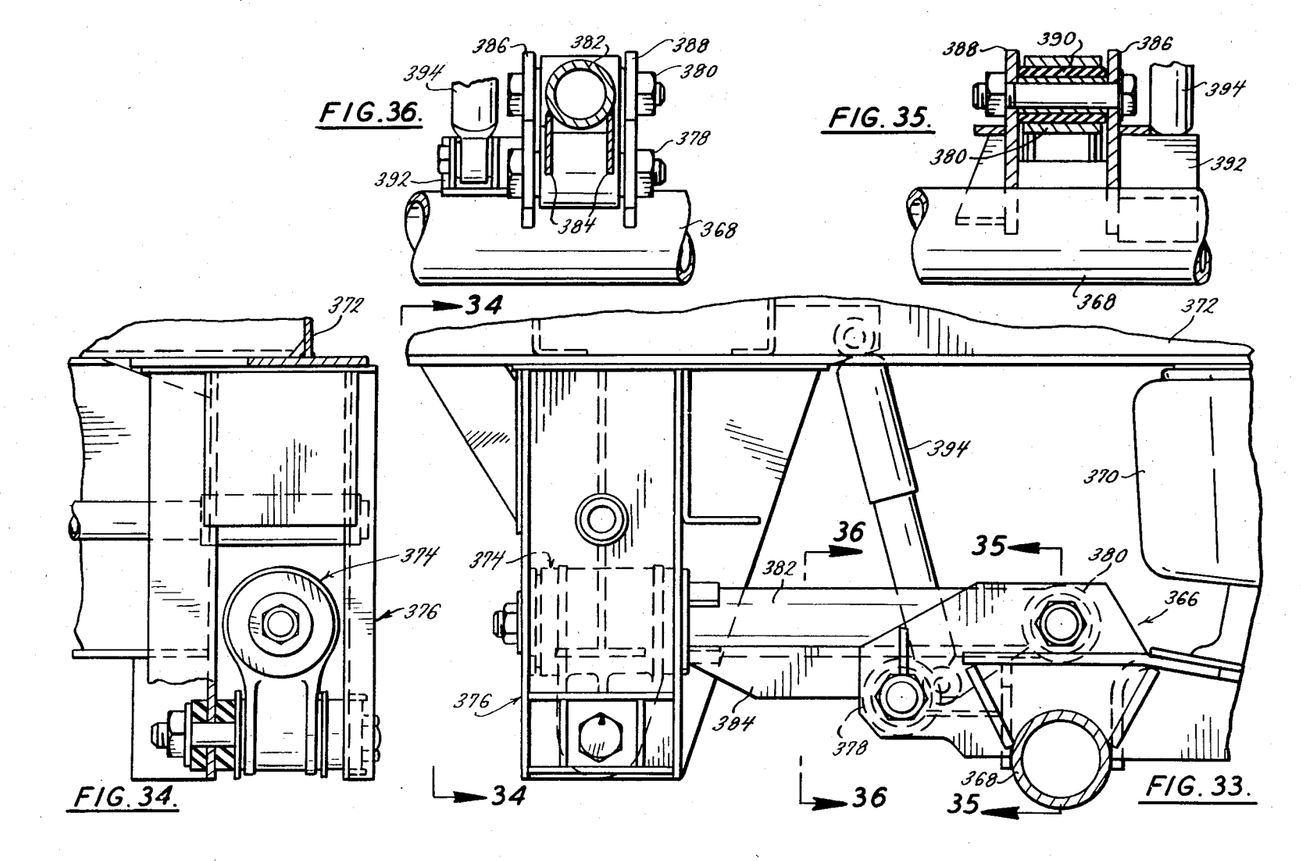
FIG. 33 is a side view of a suspension having a two member torque beam with spaced elastomeric bushings joining the members and mounted to an axle in overslung manner with a universal joint mount.
FIG. 34 is a front view taken along the plane of line 34—34 in FIG. 33.
FIG. 35 is a cross-sectional view of the axle and one elastomeric bushing taken along the plane of line 35—35 in FIG. 33.
FIG. 36 is a cross-sectional view of the torque beam detailing its construction and mounting to the axle taken along the plane of line 36—36 in FIG. 33.

Still another embodiment of the present invention is shown in FIGS. 33–36 and includes an overslung two-piece torque beam 366 mounted to axle 368 with an air spring 370 extending between the rear of torque beam 366 and chassis member 372, and a U-joint 374 mounting the forward end of torque beam 366 to a front hanger assembly 376 suspended from chassis member 372. As shown in FIGS. 35 and 36, a pair of bushing members 378, 380 connect the generally cylindrical torque rod 382 and bracket members 384 comprising the forward end of torque beam 366 to the rear portion of torque beam 366 comprised of bracket members 386, 388. As shown in greater detail in FIG. 35, each of the bushings 378, 380 include an elastomeric member 390 which permit limited oscillation between the two portions of torque beam 366. Torque beam 366 also has a shock mounting bracket 392 to mount an end of shock absorber 394 extending between it and chassis member 372.

OPERATION

As can be appreciated from the foregoing, applicant's drive axle suspension comprises a torque beam which is fixedly mounted to the axle and which has an air spring suspending it from the chassis at its rearward end. The forward end of the torque beam is mounted through a universal joint comprised of transversly aligned first and second rubber bushings. The first rubber bushing is coaxially mounted to the forward end of the torque beam and accommodates lateral "rocking" or pivoting thereof such as might be experienced should one end of the axle move upwardly with respect to the other end of the axle. As can be appreciated, as the vehicle is driven over a curb or chuck hole, this condition can exist which would otherwise tend to torsion the torque beam. The first rubber bushing in each suspension accommodates this twisting movement by permitting limited pivoting of the beam in a lateral plane with respect to the chassis.

The second rubber bushing which may be mounted either above or below the first rubber bushing, is oriented transversely to the first bushing and parallel to the axle. As the spring is mounted at the opposite end of the torque beam, up and down movement of the axle and spring result in a pivoting movement about this second bushing in a longitudinal plane. In applicant's other embodiments, the transversely mounted rubber bushing mounts to the front hanger assembly at a point closer to the horizontal plane passing through the center line of the axle. As can be appreciated, this results in a more desirable pivoting movement for the suspension as a radius drawn between the centerlines of the axle and transversely mounted bushing is virtually horizontal such that the axle stays closer to its desired "pitch" as the suspension oscillates. Of course, in a drive line it is desirable to maintain the axle in a constant pitch as it oscillates with respect to the chassis to maintain the drive line in alignment. With these other embodiments, this oscillation results in more effective alignment control, although both arrangements are more than adequate for reliable operation. The cross radius rod and torsion bar operate as in any of applicant's other suspensions, and as known in the art.

The embodiments which incorporate a U-joint having its transversely mounted bushing oriented along the same horizontal centerline as that of the axle may further include a torque beam having two members, the two members being mounted and stabilized by a pair of spaced elastomeric bushings. These spaced elastomeric bushings permit a limited amount of flex between the torque beam members to further accommodate the articulation of the axle as one end thereof deflects to a different position from the chassis than the other. This two-piece torque beam and spaced parallel bushing design can be used with either an underslung axle mount and a single air spring extending between the torque beam and the chassis, or an overslung axle mount simply by reversing the U-joint such that the transversely mounted bushing is either above or below the other bushing. With this arrangement, the transversely mounted bushing of the U-joint can be oriented generally along the same horizontal centerline as the axle to maintain the virtual vertical articulation thereof as it moves with respect to the chassis.

In the steer axle embodiment, the forward end of the torque beam is mounted with a universal joint much as in the two embodiments of the drive axle suspension, and operates substantially as described above. However, instead of a cross radius rod and torsion-roll bar, a roller guide means is provided on the outboard side of each suspension to limit the lateral displacement of the suspension and axle with respect to the chassis. The roller guide means includes a roller assembly mounted to an end of a bracket member welded to the chassis and extending downwardly, with the roller aligned with the side of the torque beam and an upstanding bracket mounted to the top of the torque beam to provide an adequate amount of travel to accommodate oscillation of the suspension during operation. A brace extends between the side walls of the torque beam to strengthen same and accommodate the increased stress at the point caused by the roller guide means. A splash plate mounted to the bottom of the torque beam helps to protect the roller guide and prevent an undue amount of debris from being thrown onto the roller and its surface. The roller guide means helps provide lateral stability without the use of a cross radius rod, panhard bar, or other similar structure which would be very difficult to fit within the severe space limitations imposed on a steering axle suspension.

Various changes and modifications to applicant's invention would be apparent to one of ordinary skill in the art. These changes and modifications are taught by applicant and are included in his invention which is limited only by the scope of the claims appended hereto.

What is claimed is:

1. A suspension system for supporting the chassis of a vehicle from at least one axle comprising a relatively rigid, non-yieldable torque beam adapted to mount to the axle, a spring means mounted to an end of said torque beam and adapted to mount to the chassis, and means to mount the other end of said torque beam to the chassis, said beam mounting means having means less rigid and more yieldable than the torque beam to permit limited revolution of said beam thereabout in a longitudinal plane, and to permit limited rotation of said beam about its longitudinal axis to minimize torsional forces in the torque beam as the axle moves with respect to the chassis.

2. The suspension of claim 1 wherein the torque beam mounting means includes a universal joint.

3. The suspension of claim 2 wherein the spring means is an air spring.

4. The suspension of claim 2 further comprising a hanger assembly for mounting to the chassis and depending downwardly therefrom, said universal joint including a pair of transversely oriented bushings, one of said bushings being adapted to pivotally mount thereto to the hanger assembly.

5. The suspension of claim 4 further comprising a shock absorber pivotally mounted to the beam and adapted to pivotally mount to the chassis.

6. The device of claim 4 further comprising a second suspension system mounted to the other side of the vehicle and wherein said hanger assemblies include a first portion mounted substantially beneath the chassis, and a second portion mounted outboard thereof, said second portion having means to pivotally mount said universal joint, and a bolster beam extending between said hanger assemblies.

7. The device of claim 4 wherein the beam is mounted to the axle in an overslung manner, and the bushing mounted to the hanger assembly is oriented below the other bushing comprising the universal joint.

8. The device of claim 4 wherein the beam is mounted to the axle in an underslung manner, and the bushing mounted to the hanger assembly is oriented above the other bushing comprising the universal joint.

9. The suspension of claim 2 wherein the universal joint comprises a first elastomeric bushing coaxially mounted to the beam and a second elastomeric bushing transversely mounted to said first bushing and adapted to mount to the chassis.

10. The suspension of claim 9 wherein at least one of said bushings includes at least one generally cylindrical elastomeric member and means to compress said elastomeric member comprising at least one compression plate, and means to tighten said compression plate against said elastomeric member.

11. The device of claim 9 wherein said transversely mounted bushing has its axis oriented substantially along the same horizontal plane as the axle.

12. The suspension of claim 1 wherein the beam comprises two beam members, and further comprising at least one bushing pivotally connecting said beam members.

13. The suspension of claim 12 wherein said beam members comprise a fore beam and an aft beam, and wherein the aft beam member is rigidly connected to the axle, the spring means being mounted to said aft beam member, and wherein two spaced apart bushings join the beam members, the fore beam member extending forwardly from the axle, and further comprising a hanger assembly depending downwardly from the chassis, said beam mounting means mounting the forward end of sad fore beam member to the hanger assembly.

14. The suspension of claim 12 wherein a pair of spaced bushings are each pivotally connected between said beam members.

15. The suspension of claim 14 wherein both of said bushings and the beam are mounted substantially above the horizontal centerline of the axle, and one of said bushings is substantialy aligned with the vertical centerline of the axle.

16. The suspension of claim 14 wherein both of said bushings and the beam are mounted substantially below the horizontal centerline of the axle, and one of said bushings is mounted fore of the axle and the other of said bushings is mounted aft of the axle.

17. The suspension of claim 14 wherein each bushing has an elastomeric member to permit limited oscillation between said beam members.

18. In a suspension assembly for supporting a vehicle chassis from at least one vehicle axle, said chassis having a longitudinally extending rail frame undercarriage, said suspension having a longitudinally extending torque arm, the improvement comprising means to pivotally connect the forward end of the torque arm outboard of said rail frame including a hanger assembly adapted to mount to the rail frame and depend downwardly therefrom, said hanger assembly including a pair of spaced vertically depending brackets, said rackets having means to mount a bushing therebetween, and a bolster beam extending between said brackets and laterally underneath the rail frame to strengthen said vertical brackets.

19. The device of claim 18 wherein a suspension is mounted between the axle and chassis on both sides of the vehicle, and wherein the bolster beam extends between hanger assemblies on both sides of the vehicle.

20. A suspension system for supporting the chassis of a vehicle from at least one axle comprising a rigid, relatively non-yieldable torque beam having first and second ends, means spaced from the first end for joining the torque beam to the axle, spring means connected between the torque beam and the chassis at a position spaced from the first end of the torque beam, the chassis having a torque beam support, connector means to support the first end of the torque beam by the support, the connector means including a first element that is more yieldable than the torque beam and being positioned intermediate the torque beam and the support to permit limited pivoting about a transverse axis at the first element, and including a second element that is more yieldable than the torque beam and being positioned intermediate the torque beam and the support to permit limited rotation of the torque beam about a longitudinal axis upon yielding of the second element to forces applied in torsion to the torque beam, whereby the torque beam can be of rigid, relatively non-yieldable construction and yet have limited revolution about a transverse axis and limited rotation about a longitudinal axis.

21. The suspension system of claim 20 wherein the first element is an elastomer member having one side fixed to the support and the other side fixed to the second element.

22. The suspension system of claim 21 wherein the second element comprises an elastomer member having one side fixed to the first element and another side fixed to the torque beam.

23. The suspension system of claim 20 wherein the axle is between the spring means and the first end of the torque beam.

24. The suspension system of claim 20 wherein the spring means is adjacent the second end of the torque beam.

25. The suspension system of claim 20 wherein the torque beam has a first horizontal section, a second horizontal section vertically offset from the first horizontal section, and a generally vertical section between the first and second horizontal sections; and the spring means is mounted to the second horizontal section.

26. The suspension system of claim 25 wherein the second horizontal section is lower than the first horizontal section.

27. The suspension system of claim 26 wherein the axle is mounted to the first horizontal section.

28. The suspension system of claim 27 wherein the first horizontal section is mounted to the axle in an overslung manner.

29. The suspension system of claim 20 wherein the spring means comprises an air spring.

30. The suspension system of claim 20 further comprising a hanger assembly depending downwardly from the chassis, the first element comprising a bushing adapted to pivotally mount to the hanger assembly.

31. The suspension system of claim 30 further comprising a second suspension system, the first mentioned and the second suspension system being on opposite sides of the vehicle, the hanger assembly of each system having at least a portion mounted outboard of the chassis.

* * * * *

UNITED STATES PATENT AND TRADEMARK OFFICE
CERTIFICATE OF CORRECTION

PATENT NO. : 4,541,653
DATED : September 17, 1985
INVENTOR(S) : John E. Raidel

It is certified that error appears in the above-identified patent and that said Letters Patent is hereby corrected as shown below:

The term of this patent subsequent to August 14, 2001, has been disclaimed.

Signed and Sealed this

Twenty-fourth Day of June 1986

[SEAL]

Attest:

DONALD J. QUIGG

Attesting Officer

Commissioner of Patents and Trademarks